US008885810B2

(12) United States Patent
Wada

(10) Patent No.: US 8,885,810 B2
(45) Date of Patent: Nov. 11, 2014

(54) TELEPHONE COMMUNICATION CONTROL APPARATUS, TELEPHONE COMMUNICATION SYSTEM AND TELEPHONE COMMUNICATION CONTROL METHOD USED FOR THE SAME

(75) Inventor: Yoshio Wada, Tokyo (JP)

(73) Assignee: NEC Corporation, Tokyo (JP)

( * ) Notice: Subject to any disclaimer, the term of this patent is extended or adjusted under 35 U.S.C. 154(b) by 1451 days.

(21) Appl. No.: 12/358,787

(22) Filed: Jan. 23, 2009

(65) Prior Publication Data

US 2009/0207990 A1 Aug. 20, 2009

(30) Foreign Application Priority Data

Feb. 20, 2008 (JP) ................................. 2008-038124

(51) Int. Cl.
*H04M 3/42* (2006.01)
*H04M 3/436* (2006.01)

(52) U.S. Cl.
CPC .......... *H04M 3/436* (2013.01); *H04M 3/42238* (2013.01); *H04M 3/42153* (2013.01); *H04M 3/42102* (2013.01); *H04M 3/42365* (2013.01)
USPC ............ 379/212.01; 379/201.01; 379/201.07; 379/201.08; 379/211.02

(58) Field of Classification Search
CPC ................. H04M 15/7652; H04M 2215/7245; H04M 3/42238; H04M 3/436; H04M 1/663; H04M 15/765
USPC ............... 379/212.01, 211.02, 93.11, 211.01, 379/201.01, 201.07, 201.08, 207.15; 370/352
See application file for complete search history.

(56) References Cited

U.S. PATENT DOCUMENTS

| 5,930,338 | A | 7/1999 | McKendry et al. |
|---|---|---|---|
| 2004/0028208 | A1 | 2/2004 | Carnazza |
| 2008/0144798 | A1* | 6/2008 | Sidhom et al. ............ 379/211.02 |
| 2008/0292074 | A1* | 11/2008 | Boni et al. ................. 379/93.11 |
| 2011/0044322 | A1* | 2/2011 | Deng et al. .................... 370/352 |

FOREIGN PATENT DOCUMENTS

| JP | 8-251639 A | 9/1996 |
|---|---|---|
| JP | 2000125351 A | 4/2000 |

(Continued)

OTHER PUBLICATIONS

Japanese Office Action for JP2008-038124 issued Apr. 20, 2010.

(Continued)

*Primary Examiner* — Thjuan K Addy
(74) *Attorney, Agent, or Firm* — Sughrue Mion, PLLC

(57) ABSTRACT

A telephone communication control apparatus is provided that ensures a user to be reached by a person who is calling the user without requiring the user to open a number, which identifies the user, to the party. The apparatus includes
  a registry in which at least status information that indicates status of each of a number of members is registered, wherein the number of members share a fixed telephone terminal and respectively have communication terminals. The apparatus includes—
  an authentication unit that authenticates a calling subscriber number of a call based on calling subscriber information in which calling subscriber numbers approved to have a session with the members are indicated when the call is made to the number of the fixed telephone terminal. The apparatus includes—
  a transfer control unit that transfers the call that is authenticated at the authentication unit to a communication terminal based on the information in the registry.

2 Claims, 15 Drawing Sheets

(56) References Cited

FOREIGN PATENT DOCUMENTS

| | | | |
|---|---|---|---|
| JP | 2003078934 | A | 3/2003 |
| JP | 2005018194 | A | 1/2005 |
| JP | 2005026896 | A | 1/2005 |
| JP | 2006222621 | A | 8/2006 |
| WO | 03028355 | B | 4/2003 |

OTHER PUBLICATIONS

European Search Report for EP 08 16 8526 completed Apr. 24, 2009.

* cited by examiner

FIG. 3

FAMILY USER REGISTERED INFORMATION

| USER NAME | TELEPHONE NUMBER | ELECTRONIC MAIL ADDRESS | SIP URI |
|---|---|---|---|
| USER A | OXO-xxxx-xxxx | a@family.jp | SIP:a@family.sip.jp |
| USER B | OXO-yyyy-yyyy | b@family.jp | SIP:b@family.sip.jp |
| USER C | OXO-zzzz-zzzz | c@family.jp | SIP:c@family.sip.jp |

FIG. 4

FAMILY USER STATUS REGISTERED INFORMATION

| USER NAME | STATUS | COMMUNICATION MEANS |
|---|---|---|
| USER A | OUT | PORTABLE TELEPHONE |
| USER B | IN | FIXED TELEPHONE / PORTABLE TELEPHONE |
| USER C | AIRPLANE | ELECTRONIC MAIL |

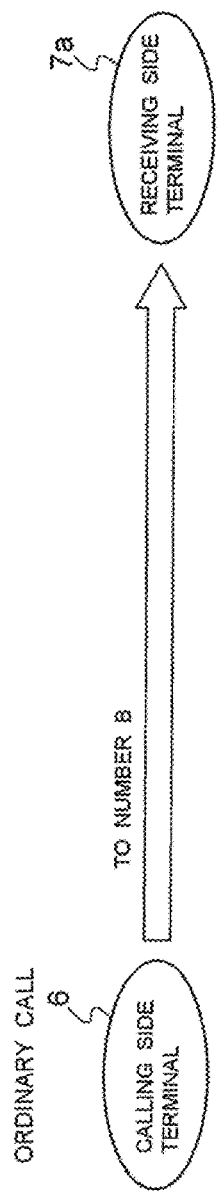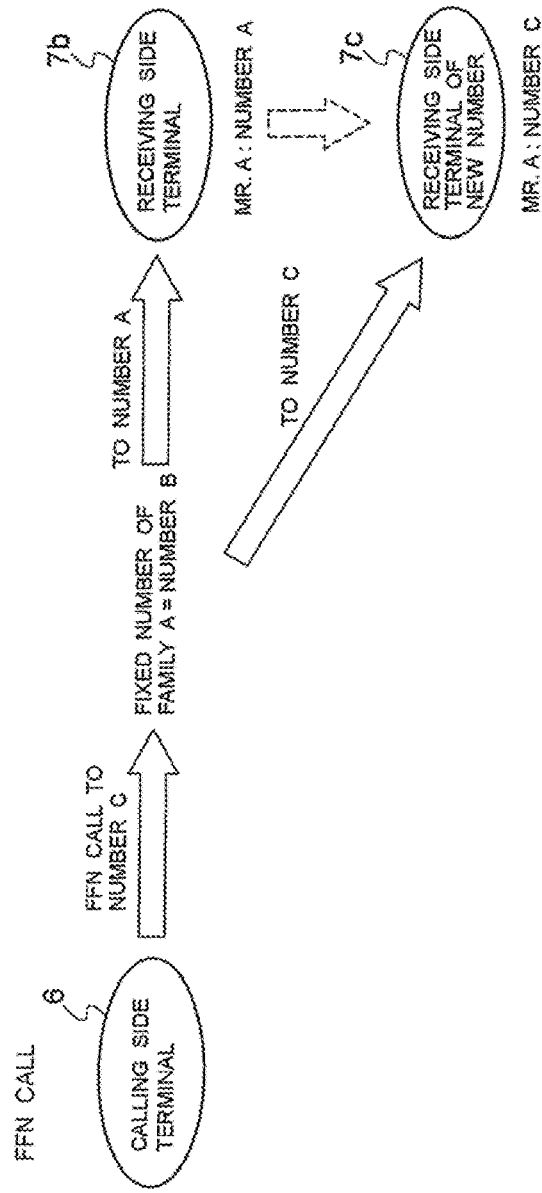

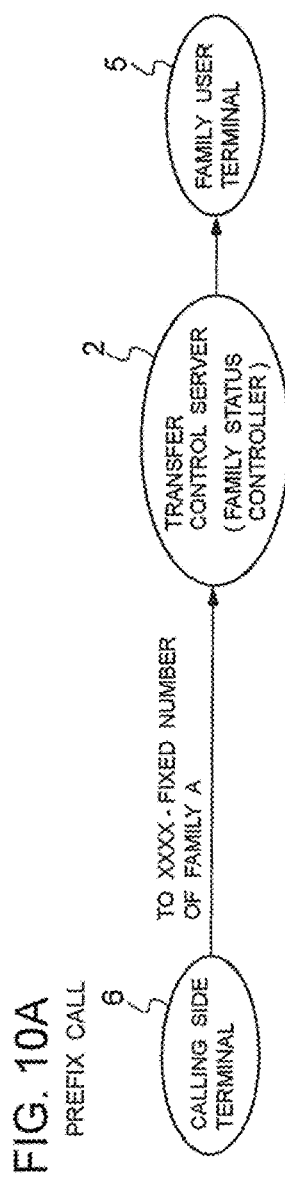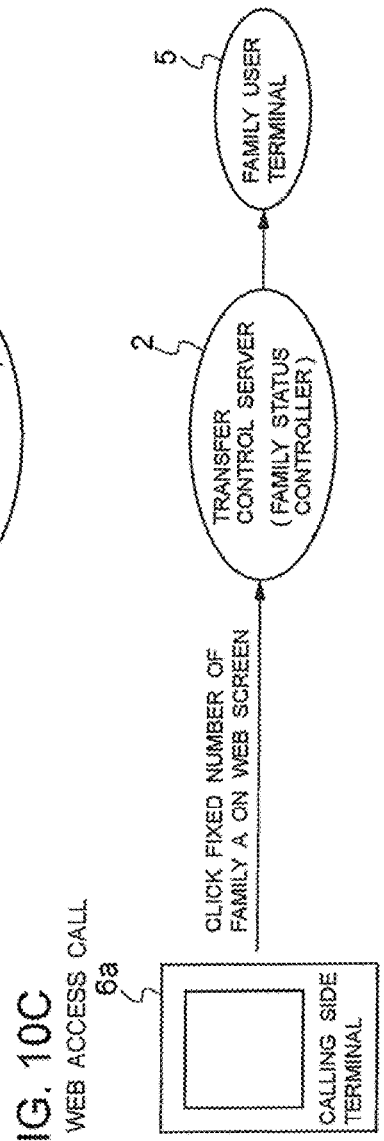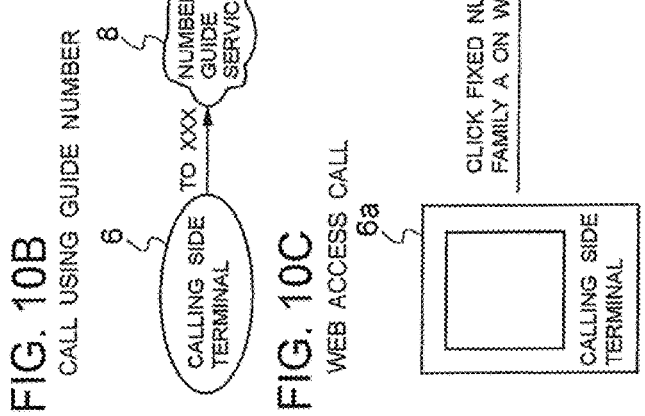

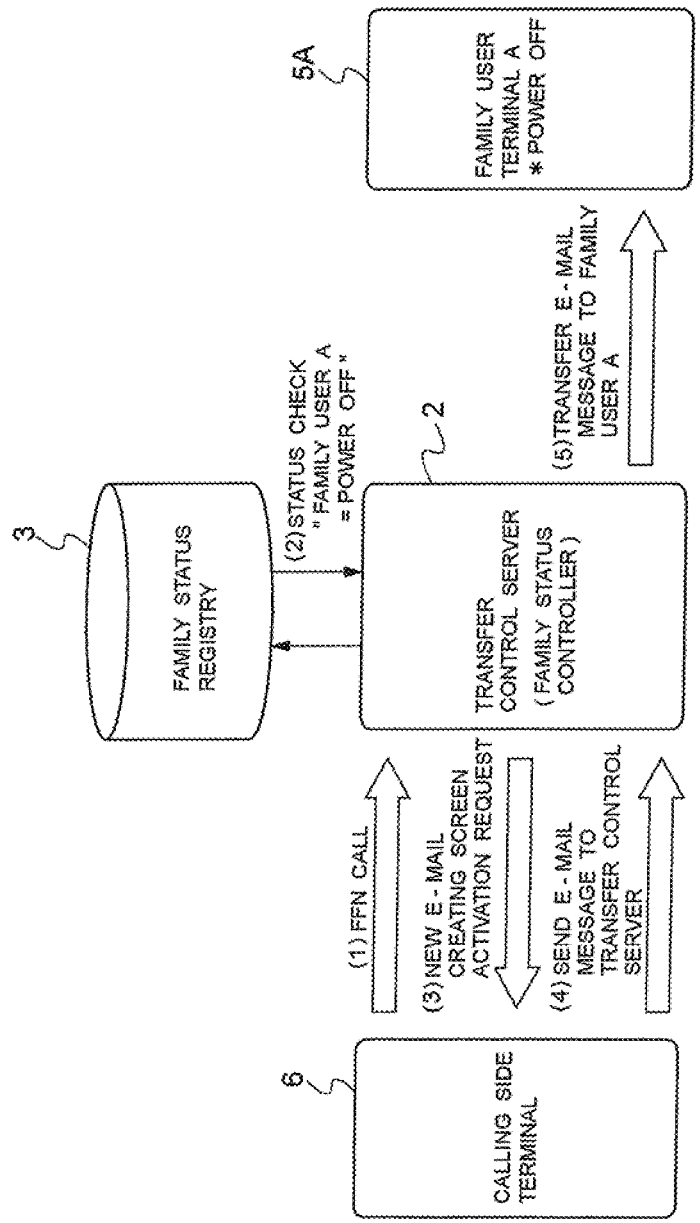

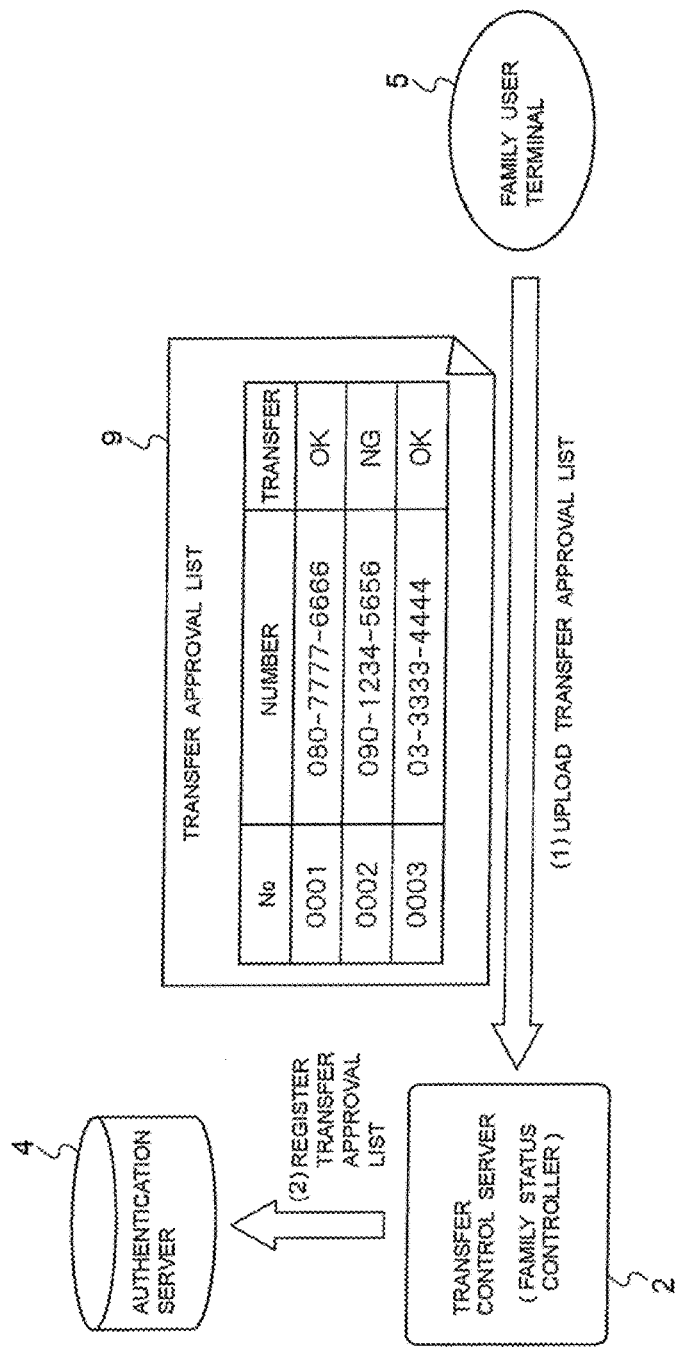

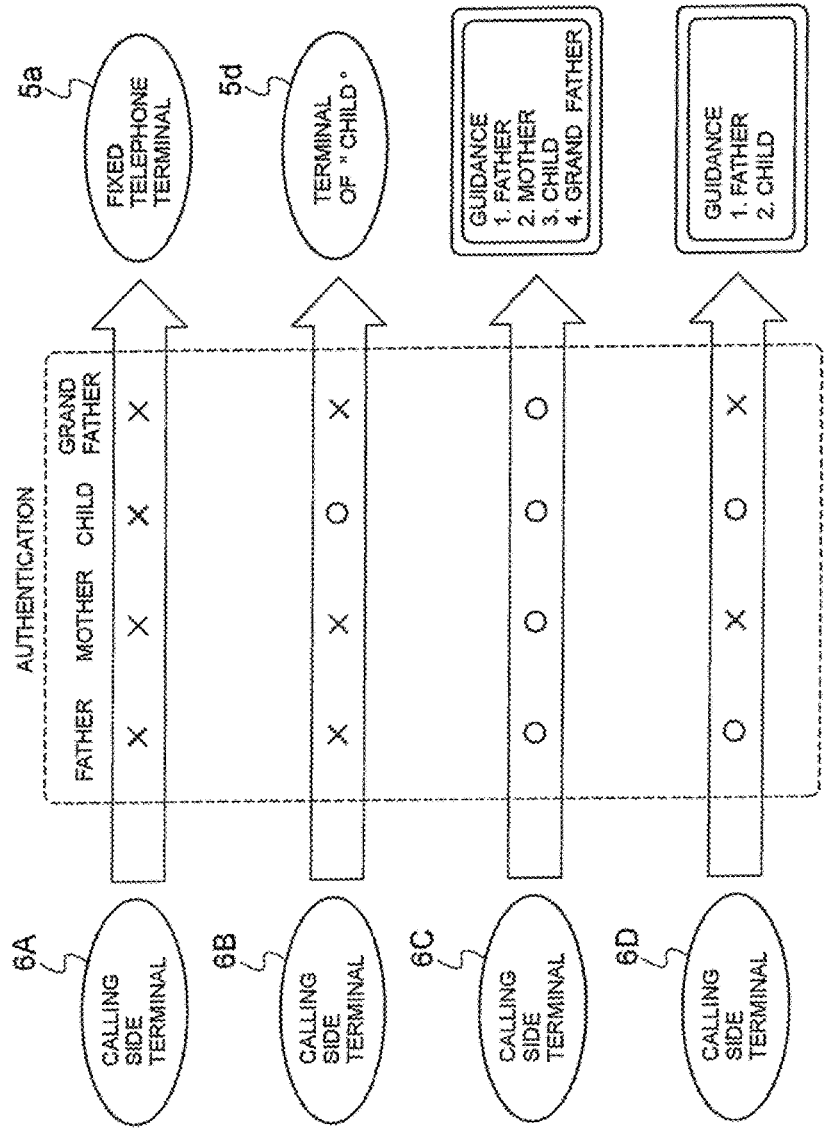

TELEPHONE COMMUNICATION CONTROL APPARATUS, TELEPHONE COMMUNICATION SYSTEM AND TELEPHONE COMMUNICATION CONTROL METHOD USED FOR THE SAME

This application is based upon and claims the benefit of priority from Japanese patent applications No. 2008-038124, filed on Feb. 20, 2008, the disclosure of which is incorporated herein its entirety by reference.

BACKGROUND OF THE INVENTION

1. Field of the Invention

The present invention relates to a telephone communication control apparatus, a telephone communication system, and a telephone communication control method used for the same, and more specifically to telephone communications for an individual using a fixed telephone, a portable telephone, and a communication terminal.

2. Description of the Related Art

No one can make a phone call to communicate over a telephone without knowing the telephone number of a person to call. In other words, a telephone user needs to open a number, which identifies the user such as the user's portable telephone number, to a person from whom the user wants to have a direct phone call.

Communication carriers have provided services for transferring an incoming call destined to a fixed telephone (a service for transferring a call between fixed telephones, a service for transferring a call from a fixed telephone to a portable telephone, and the like), and services for transferring an incoming call destined to a portable telephone (a service for transferring a call between portable telephones, a service for transferring a call from a portable telephone to a fixed telephone, and the like).

For the abovementioned communication systems that enable a receiving terminal, which is a fixed telephone or a portable telephone, to be freely changed, methods for alleviating user's time and energy in deciding an optimal receiving terminal and preventing the user from losing a chance of having a session by automatically deciding the optimal receiving terminal based on presence information at a residence of a person who is called (information on a locked/unlocked state of the lock of the residence) have been proposed (for example, see patent document 1 (Japanese Patent Application Laid-Open Publication No. 2006-222621)).

In the telephone communication system related to the present invention, the user needs to open a number, which can identify the user such as the user's portable telephone number, to a person from whom the user wants to have a direct phone call. For that reason, the user needs to notify the person of a new portable telephone number each time when the portable telephone number is changed. Even the technology described in the patent document 1 cannot solve the problem.

Further, even if the abovementioned telephone communication system simply transfers an incoming call, the calling subscriber cannot necessarily reach the called subscriber like in the case where a session cannot be made when a transferred terminal telephone is busy. The abovementioned technology described in the patent document 1 neither can solve the problem, as it transfers a call simply based on the presence information at a residence.

SUMMARY

An exemplary object of the invention is to provide a telephone communication control apparatus, a telephone communication system, and a telephone communication control method used for the same that solve the abovementioned problems and ensure a user to be reached by a person who is calling the user without requiring the user to open a number, which identifies the user, to the party.

An exemplary aspect of the invention is a telephone communication control apparatus that includes:

a registry in which at least status information that indicates status of each of a plurality of members is registered, wherein the plurality of members share a fixed telephone terminal and respectively have communication terminals;

an authentication unit that authenticates a calling subscriber number of a call based on calling subscriber information in which calling subscriber members approved to have a session with the members are indicated when the call is made to the number of the fixed telephone terminal; and a transfer control unit that transfers the call that is authenticated at the authentication unit to a communication terminal based on the information in said registry.

Another exemplary aspect of the invention is a telephone communication system that includes:

a fixed telephone terminal that is shared by a plurality of members;

a communication terminal that is used by each of the plurality of members;

a registry in which at least status information that indicates status of each of the plurality of members is registered;

an authentication unit that authenticates a caller subscriber member of a call based on calling subscriber information in which calling subscriber numbers approved to have a session with the members are indicated when the call is made to the number of the fixed telephone terminal; and a transfer control unit that transfers the call that is authenticated at the authentication unit to a communication terminal based on the information in said registry.

A further exemplary aspect of the invention is a telephone communication control method that is used for a telephone communication control apparatus that controls a telephone communication of a fixed telephone terminal and communication terminals in a system that includes the fixed telephone terminal that is shared by a plurality of members and the communication terminals used by the members respectively, the method including:

registering of at least status information that indicates status of each of the plurality of members into a registry;

authenticating of a calling subscriber number of a call based on calling subscriber information in which calling subscriber numbers approved to have a session with the members are indicated when the call is made to the number of the fixed telephone terminal; and transfer controlling to transfer the call that is authenticated at the authenticating to a communication terminal based on the information in the registry.

A still further exemplary aspect of the invention is a recording medium that stores a program that causes a computer in a telephone communication control apparatus to execute steps, wherein said telephone communication control apparatus controls a telephone communication of a fixed telephone terminal and communication terminals in a system that includes the fixed telephone terminal that is shared by a plurality of members and the communication terminals used by said members respectively, said program including:

registering of status information that indicates status of each of the plurality of members at least into a registry;

authenticating of a calling subscriber number of a call based on calling subscriber information in which calling subscriber numbers approved to have a session with the members are indicated when said call is made to the number of the fixed telephone terminal; and transfer controlling to transfer said call that is authenticated at the authenticating to a communication terminal based on the information in the registry.

BRIEF DESCRIPTION OF THE DRAWINGS

FIG. 3 is a table showing an example of family user registered information used in the first exemplary embodiment of the present invention;

FIG. 4 a table showing an example of family user status registered information used in the first exemplary embodiment of the present invention;

FIG. 8A is a diagram showing an ordinary call according to the second exemplary embodiment of the present invention;

FIG. 8B is a diagram showing an FFN call made by the second exemplary embodiment of the present invention;

FIGS. 10A-10C are diagrams showing timing of starting an FFN call according to the second exemplary embodiment of the present invention;

FIG. 11 is a diagram showing a transition of operations in the case where a called terminal of a family user is unavailable for an incoming call and available to receive electronic mail in the second exemplary embodiment of the present invention;

FIG. 12 is a diagram showing a method for uploading a transfer approval list for calling subscriber authentication performed in the second exemplary embodiment of the present invention;

FIG. 13 is a diagram showing calling subscriber authentication according to the second exemplary embodiment of the present invention;

EXEMPLARY EMBODIMENT

Before describing the exemplary embodiments of the present invention, the principle of operation of the present invention will be described.

Figure 1:
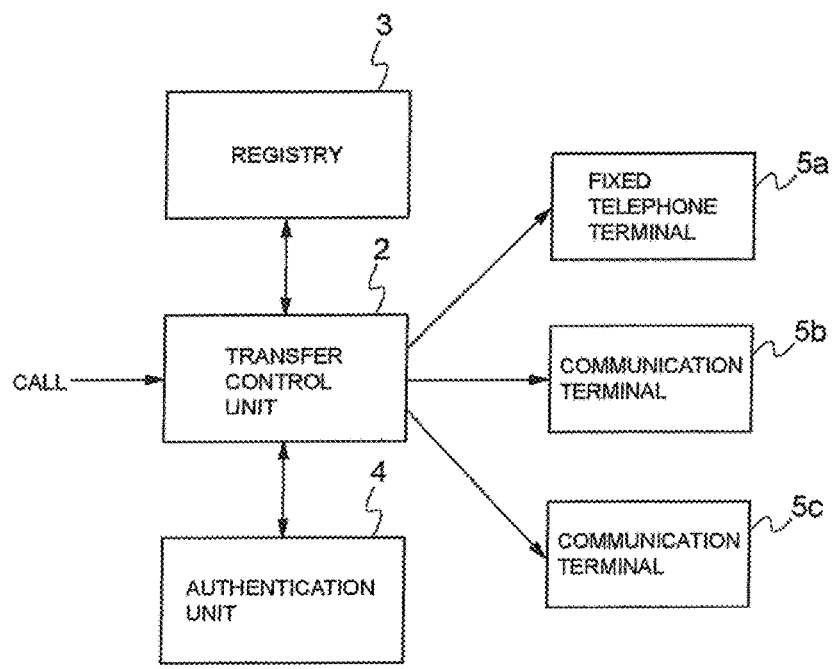
FIG. 1 is a block diagram showing an example of a telephone communication control apparatus for illustrating the principle of operation of the present invention.

FIG. 1 is a block diagram showing an example of a telephone communication control apparatus for illustrating the principle of operation of the present invention. Referring to FIG. 1, the telephone communication control apparatus according to the present invention includes: a registry 3 in which at least status information that indicates status of each of a plurality of members is registered, where the plurality of members share a fixed telephone terminal 5a and respectively have communication terminals 5b and 5c; an authentication unit 4 that authenticates a calling subscriber number of a call based on calling subscriber information in which calling subscriber numbers approved to have a session with the members are indicated when the call is made to the number of the fixed telephone terminal; and a transfer control unit 2 that transfers the call that is authenticated at the authentication unit 4 to the communication terminals 5b and 5c based on the information in the registry 3.

When the transfer control unit 2 receives a call to the fixed telephone terminal 5a, it transfers the call that is authenticated at the authentication unit 4 to either of the communication terminals 5b and 5c based on the information in the registry 3.

As such, an exemplary advantage according to the present invention is that it ensures a calling subscriber to reach a user without requiring the user to open a number, which identifies the user, to the calling subscriber.

Now, embodiments of the present invention will be described with reference to the drawings.

First Exemplary Embodiment

Figure 2:
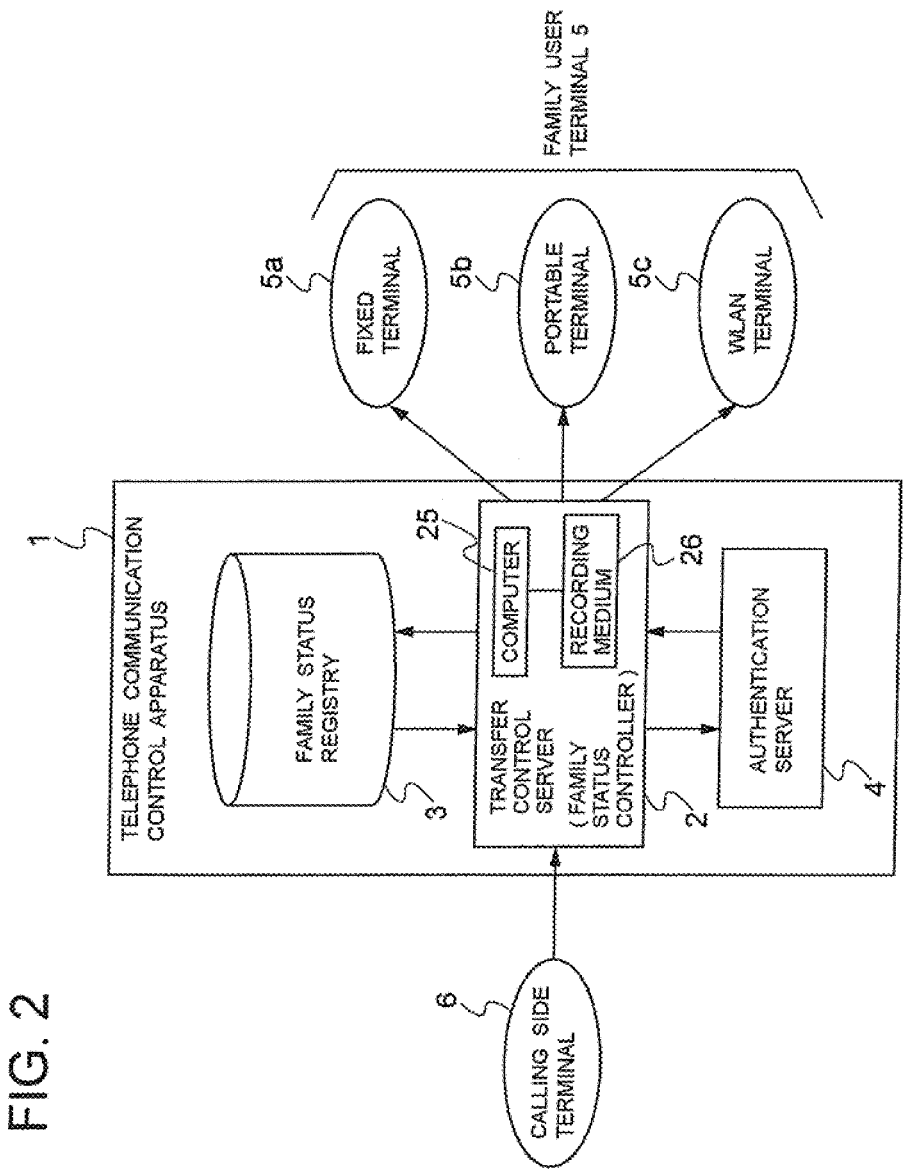
FIG. 2 is a block diagram showing an example of a configuration of a telephone communication system according to a first exemplary embodiment of the present invention.

FIG. 2 is a block diagram showing an example of a configuration of a telephone communication system according to the first exemplary embodiment of the present invention. In FIG. 2, the telephone communication system according to the first exemplary embodiment of the present invention is a system that uses a fixed telephone terminal number of the fixed terminal 5a, which is installed in a residence, as a key number.

The telephone communication system according to the present invention includes a telephone communication control apparatus 1 that is installed in the residence; and family user terminals 5 such as the fixed terminal 5a, a portable terminal 5b, and a WLAN (Wireless Local Area Network) terminal 5c.

The telephone communication control apparatus 1 includes a transfer control server (Family Status Controller) 2 that performs a search and transferring of family status; a family status registry (Family Status Registry) 3 that is a database in which at least family status is registered; and an authentication server 4 that tries authentication of a family member (hereinafter referred to as a family user), authentication of a calling subscriber, and the like.

The family user terminals 5 are a plurality of receiving side terminals that are used by each of the family users, including the fixed terminal 5a, the portable terminals 5b, the WLAN terminal 5c and the like as mentioned above. The family status registry 3 includes information for each of the family users that makes criteria in deciding one of the plurality of receiving side terminals to which a call is to be transferred.

When the transfer control server 2 receives a call from a calling side terminal 6, it authenticates a calling subscriber according to the number of the calling side terminal 6. When the transfer control server 2 authenticates the calling subscriber, it establishes a connection between a receiving side terminal (the fixed terminal 5a, the portable terminal 5b, the WLAN terminal 5c, and the like) and the calling side terminal 6 in this manner: The transfer control server 2 refers to the family status registry 3 for the status of the family user whom the calling subscriber wants, decides one of the specified family user's terminals to which a call is to be transferred by determining the type of the receiving terminal and the most inexpensive receiving means, and transfers the call.

FIG. 3 is a table showing an example of family user registered information used in the first exemplary embodiment of the present invention. In FIG. 3, user names, telephone numbers, electronic mail addresses, and SIP (Session Initiation Protocol) URIs (Uniform Resource Identifiers) are stored in the family status registry 3 as the family user registered information.

For example, the family user registered information for "user A" is the telephone number "0X0-xxxx-xxxx", the electronic mail address a@family.jp, and SIP URI SIP:a@family.sip.jp.

The family user registered information for "user B" is the telephone number "0X0-yyyy-yyyy", the electronic mail address b@family.jp, and SIP URI SIP:b@family.sip.jp.

The family user registered information for "user C" is the telephone number "0X0-zzzz-zzzz", the electronic mail address c@family.jp, and SIP URI SIP:c@family.sip.jp.

FIG. 4 is a table showing an example of family user status registered information used in the first exemplary embodiment of the present invention. In FIG. 4, user names, status, and communication means are stored in the family status registry 3 as the family user status registered information.

For example, the family user status registered information for "user A" is the status "out" and the communication means "portable telephone". The family user status registered information for "user B" is the status "in" and the communication means "fixed telephone and portable telephone". The family user status registered information for "user C" is the status "airplane" and the communication means "electronic mail".

Figure 5:
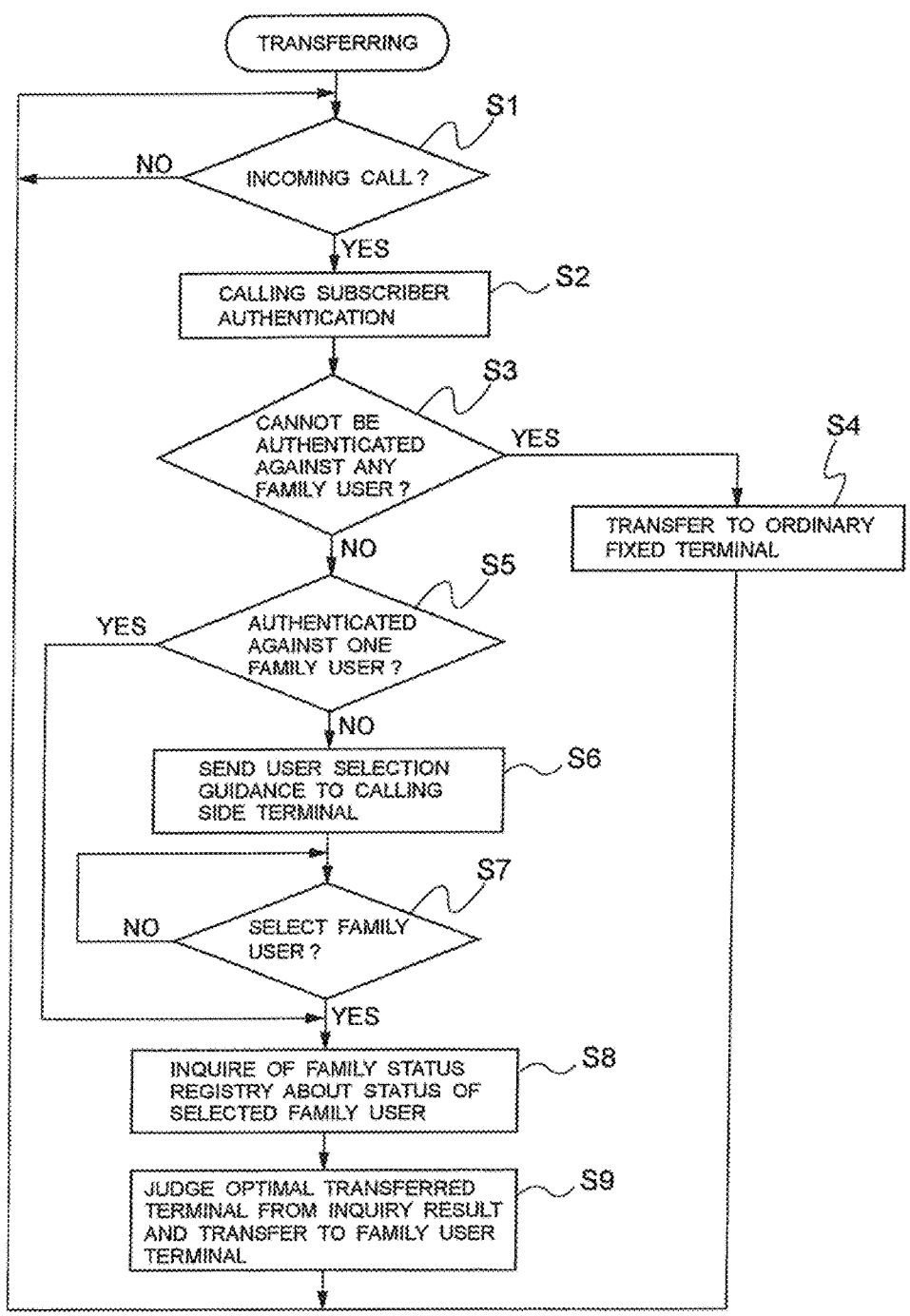
FIG. 5 is a flowchart showing transferring performed by the telephone communication control apparatus in the first exemplary embodiment of the present invention.
Figure 6:
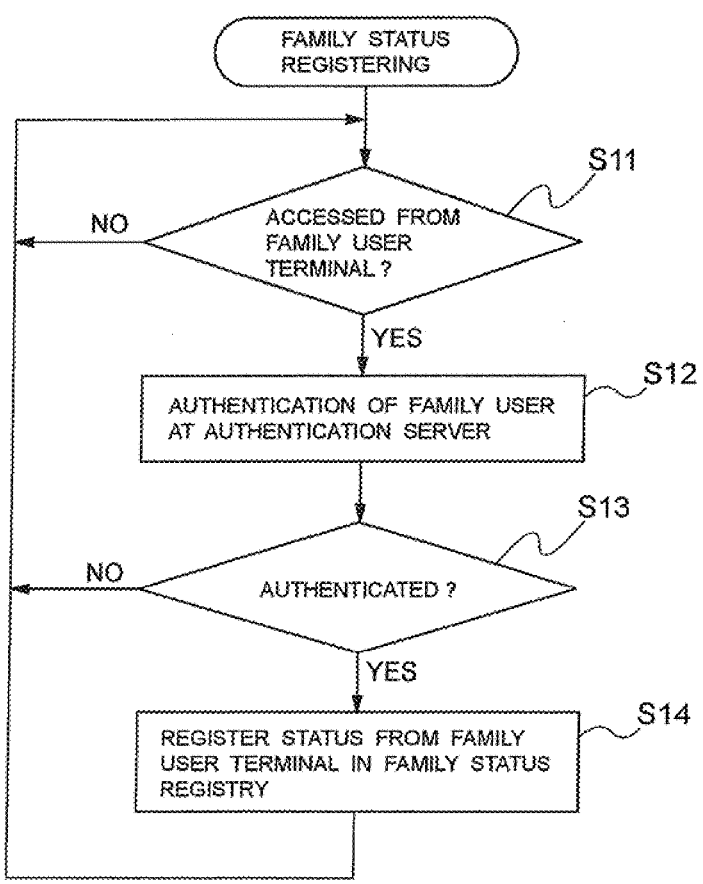
FIG. 6 is a flowchart showing family status registering performed by the telephone communication control apparatus in the first exemplary embodiment of the present invention.

FIG. 5 is a flowchart showing transferring performed by the telephone communication control apparatus 1 in the first exemplary embodiment of the present invention. FIG. 6 is a flowchart showing family status registering performed by the telephone communication control apparatus 1 in the first exemplary embodiment of the present invention. Now, operation of the telephone communication control apparatus 1 according to the first exemplary embodiment of the present invention will be described with reference to FIG. 2 to FIG. 6. The processing shown in is FIG. 5 and FIG. 6 is accomplished by causing a computer 25 [CPU (central processing unit) and the like] in the transfer control server 2 of the telephone communication control apparatus 1 to execute a program that is stored in a recording medium 26 (see FIG. 2).

When the transfer control server 2 of the telephone communication control apparatus 1 receives the call from the calling side terminal 6 (incoming) (step S1 in FIG. 5) it authenticates the calling subscriber according to the number of the calling side terminal 6 (step S2 in FIG. 5). In that case, each of the family users has registered a transfer list in the authentication server 4 via the transfer control server 2 in advance. The list includes the numbers of the calling side terminals 6, calls from which are approved by the user to be transferred to the user's terminal. When the transfer control server 2 receives the call from the calling side terminal 6, it tries authentication of the call by comparing the number of the calling side terminal 6 and the numbers in the transfer approval list (confirmation that the numbers match) at the authentication server 4.

If the transfer control server 2 cannot authenticate the calling subscriber against any of the family users (step S3 in FIG. 5), it transfers the call from the calling side terminal 6 to the ordinary fixed terminal 5a (step S4 in FIG. 5).

If the transfer control server 2 can authenticate the calling subscriber against any of the family users (step S3 in FIG. 5) and can also authenticate it against one of the family users (step S5 in FIG. 5), it inquires of the family status registry about the status of the family user (step S8 in FIG. 5), judges the optimal transferred terminal from the inquiry result and transfers the call to the family user terminal 5 (step S9 in FIG. 5).

If the transfer control server 2 cannot authenticate the calling subscriber against one of the family users (step S5 in FIG. 5), i.e., it can authenticate the calling subscriber against two or more of the family users, it sends a user selection guidance to the calling side terminal 6 (step S6 in FIG. 5), and has the calling subscriber select the family user (step S7 in FIG. 5).

The transfer control server 2 inquires of the family status registry 3 about the status of the family user that is selected by the calling subscriber (step S8 in FIG. 5), judges the optimal transferred terminal from the inquiry result and transfers the call to the family user terminal 5 (step S9 in FIG. 5).

The optimal transferred terminal is judged on such a criterion as the current status of the family users or the cost. For example, such criteria are used: (1) the fixed telephone is called because the family user is at home, (2) the call is made via the WLAN because the family user is outside the house but within a public WLAN area, (3) the portable telephone is called via the Femto-cell because the family user is at home but the Femto-cell is installed in the house and provides less cost.

Now, the family status registering performed by the telephone communication control apparatus 1 will be described. When the transfer control server 2 of the telephone communication control apparatus 1 is accessed from the family user terminal 5 (step S11 in FIG. 6), it tries authentication to confirm that the originator of the access is the family user at the authentication server 4 (step S12 in FIG. 6).

In that case, the family users have registered the self numbers in the authentication server 4 in advance. The information shown in FIG. 3 is considered as the family user registered information. When the transfer control server 2 is accessed from the family user terminal 5, it tries authentication by comparing the access with the family user numbers that are registered in the authentication server 4 (confirmation that the numbers match).

When the transfer control server 2 authenticates the access (step S13 in FIG. 6), it registers the status from the family user terminal 5 in the family status registry 3 (step S14 in FIG. 6). The information shown in FIG. 4 is considered as the family user status registered information.

An exemplary advantage according to the first exemplary embodiment of the invention is that the calling subscriber can directly reach a specific family user by calling the telephone number of the fixed telephone 5a, which is the key number of the family, from the calling side terminal 6.

In that case, according to the first exemplary embodiment, the calling subscriber can directly reach a specific family user only with the telephone number of the fixed telephone 5a, which is the key number of the family, even if the calling subscriber does not know the telephone number, the electronic mail address and the like of the family user. Further, according to the first exemplary embodiment, as the user only needs to open the key number, the user can intentionally keep the number that identifies the user secret from the calling subscriber.

The current status of the family user is manually or automatically registered in the family status registry 3, which is a status registering database, at the receiving side. Thus, the first exemplary embodiment can almost completely ensure the calling subscriber to reach a specific family user by making the receiving side receive the call in receiving means suitable for the registered status [fixed telephone, portable telephone, electronic mail or VoIP (Voice over Internet Protocol)].

Second Exemplary Embodiment

Figure 7:
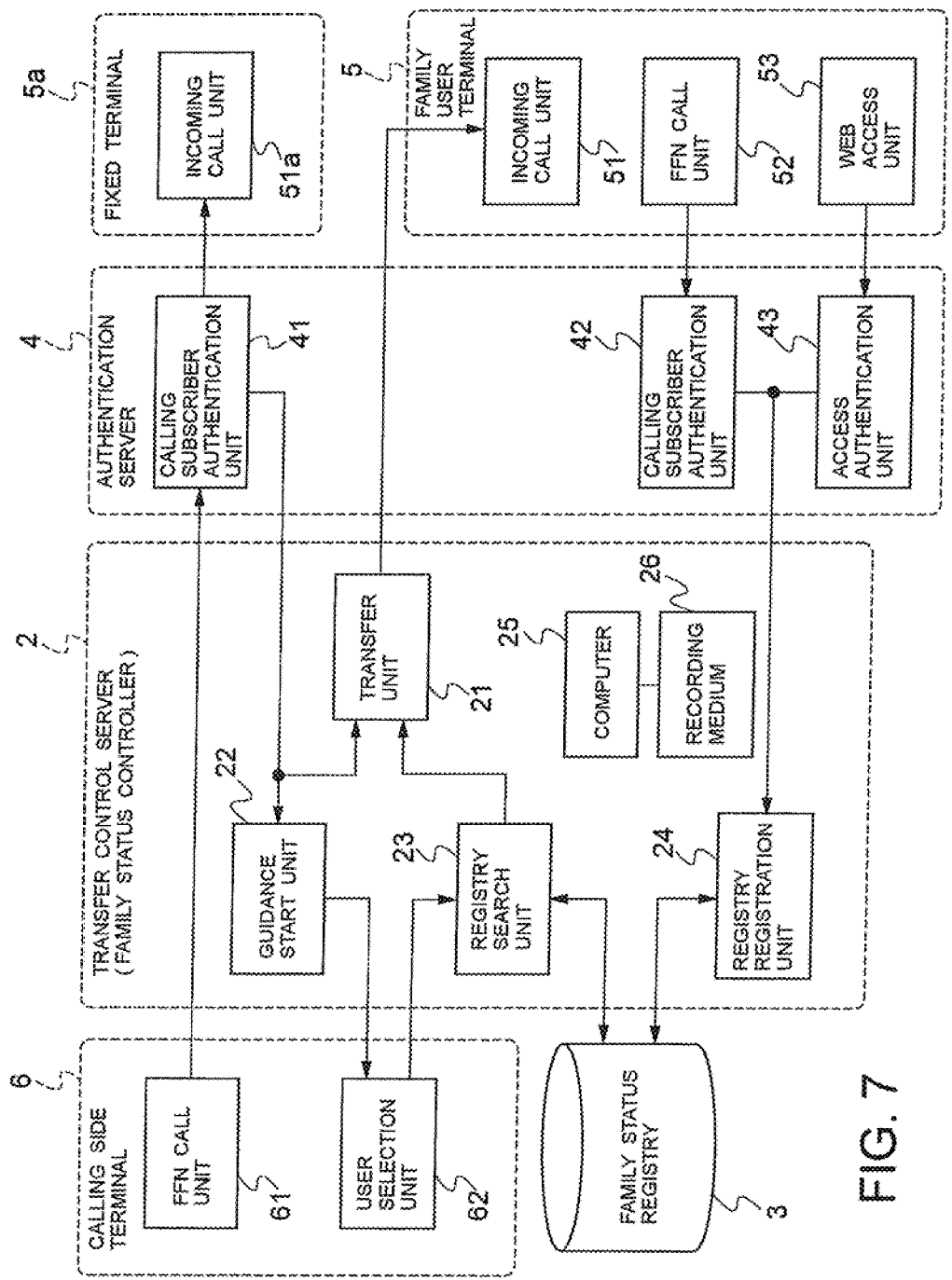
FIG. 7 is a block diagram showing an example of a configuration of a telephone communication system according to a second exemplary embodiment of the present invention.

FIG. 7 is a block diagram showing an example of a configuration of a telephone communication system according to a second exemplary embodiment of the present invention. In FIG. 7, the telephone communication system according to the second exemplary embodiment of the present invention is a system that uses a fixed telephone number of the fixed terminal 5a, which is installed in a residence, as a key number.

The telephone communication system according to the second exemplary embodiment of the present invention includes the transfer control server (Family Status Controller) 2, the family status registry (Family Status Registry) 3, the authentication server 4, the family user terminals 5, the fixed terminal 5a, and the calling side terminal 6.

The transfer control server 2 includes a transfer unit 21, a guidance start unit 22, a registry search unit 23, a registry registration unit 24, a computer 25, and a recording medium 26. The authentication server 4 includes calling subscriber authentication units 41 and 42, and an access authentication unit 43.

The family user terminal 5 includes an incoming call unit 51, an FFN (Family Fixed Number) call unit 52, and a WEB access unit 53. The fixed terminal 5a includes an incoming call unit 51a. The calling side terminal 6 includes an FFN call unit 61 and a user selection unit 62.

A transition of FFN service operation according to the second exemplary embodiment starts when the calling side terminal 6 makes an FFN call from the FFN call unit 61. The FFN call will be described later. The transfer control server 2 that received the FFN call performs calling subscriber authentication at the calling subscriber authentication unit 41 in the authentication server 4. As a result of the calling subscriber authentication, if the transfer control server 2 cannot authenticate the calling subscriber against any of the family user, it transfers the call from the calling side terminal 6 to the ordinary fixed terminal 5a.

If the transfer control server 2 can authenticate the calling subscriber against one of the family user, it transfers the call as it is from the calling side terminal 6 to the receiving side terminal of the family user. If the transfer control server 2 can authenticate the calling subscriber against two or more family users, it sends the user selection guidance to the calling side terminal 6 from the guidance start unit 22.

When a family user is selected at the user selection unit 62 of the calling terminal 6 according to the guidance, the transfer control server 2 inquires of the family status registry 3 about the status of the selected family user. The transfer control server 2 judges the optimal transferred terminal from the inquiry result and transfers the call to the family user terminal 5. Then, the family user can receive the call from the calling side terminal 6.

A transition of registration operation of the family user status into the family status registry 3 starts when an access is tried from the FFN call unit 52 or the WEB access unit 53 of the family user terminal 5 to the transfer control server 2.

When an access is tried from the family user terminal 5, the transfer control server 2 tries authentication to confirm that the access is from a family user at the calling subscriber authentication unit 42 of the authentication server 4. If the transfer control server 2 can authenticate the access, it proceeds with a procedure of registering the status of the accessing family user into the family status registry 3.

FIG. 8A is a diagram showing an ordinary call according to the second exemplary embodiment of the present invention. FIG. 8B is a diagram showing an FFN call according to the second exemplary embodiment of the present invention. As shown in FIG. 8A, if a telephone number B of Mr. A is input at the calling side terminal 6 in the case of the ordinary call, the call is sent to a receiving side terminal 7a of Mr. A.

As shown in FIG. 8B, the fixed number B of the family A is input at the calling side terminal 6 and a call is made at timing of making the FFN call in the case of the FFN call (a method for starting the FFN call will be described later). The call made to the fixed number B is transferred and connected to a receiving side terminal 7b of Mr. A.

Even in the case where the telephone number of Mr. A changed from the telephone number B to a telephone number C, the calling side can make a phone call to a receiving side terminal 7c of Mr. A of the new telephone number C by calling the fixed number B of the family A.

Figure 9:
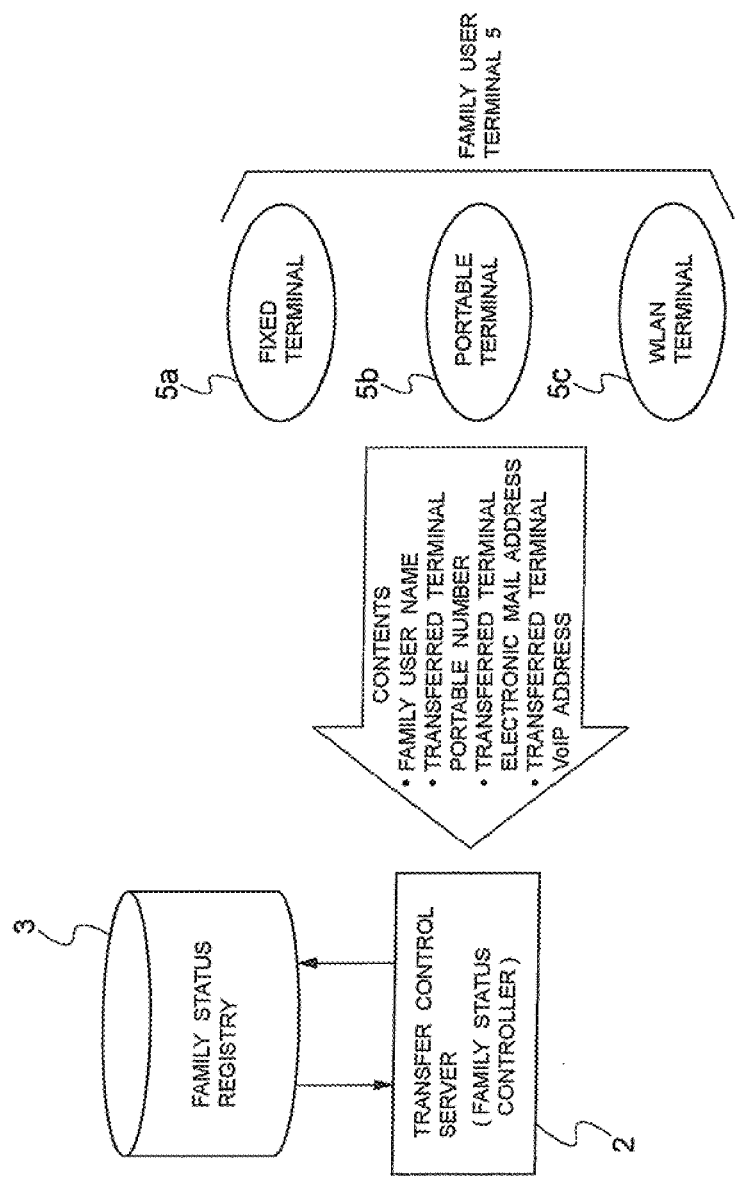
FIG. 9 is a diagram showing an initial status registering procedure for a family user performed in the second exemplary embodiment of the present invention.

FIG. 9 is a diagram showing an initial status registering procedure for a family user performed in the second exemplary embodiment of the present invention. As shown in FIG. 9, the second exemplary embodiment requires a task of registering the family user to the fixed number in order to start the FFN service.

The family user registers numbers and addresses given to the user such as "family user name", "transferred terminal portable telephone number", "transferred terminal electronic mail address", and "transferred terminal VoIP address" in the family status registry 3 through the transfer control server 2 from the family user terminal 5 such as the fixed terminal 5a, the portable terminal 5b, the WLAN terminal 5c and the like in advance.

FIGS. 10A-10C are diagrams showing timing of starting the FFN call according to the second exemplary embodiment of the present invention. There are three patterns of timing of starting the FFN service by the second exemplary embodiment as shown in FIGS. 10A-10C.

First, a prefix call will be described. As shown in FIG. 10A, the FFN service starts when a phone call is made with a fixed prefix number added to the beginning of the telephone number.

Next, a call using a guided number will be described. As shown in FIG. 10B, first, the calling side terminal 6 calls the number guide service 8. The FFN service starts when the fixed number of the called terminal is input according to the guidance.

Last, a WEB access call will be described. As shown in FIG. 10C, the WEB access call is available in the case where the VoIP call is made on a WEB screen of the calling side terminal 6. In that case, a link to the ordinary call and a link to the FFN call are displayed on the screen. The call starts when the link to the FFN call is clicked.

FIG. 11 is a diagram showing a transition of operations in the case where a called terminal of a family user is unavailable for an incoming call and available for receiving electronic mail in the second exemplary embodiment of the present invention. The calling side terminal 6 makes the FFN call to the family user terminal (A) 5A [(1) in FIG. 11]. The family user terminal (A) 5A, however, is in the power OF? state and unavailable for an incoming call.

When the transfer control server 2 receives the status of the family user terminal (A) 5A [(2) in FIG. 11], it issues a new e-mail creating screen activation request to the calling side terminal 6 [(3) in FIG. 11]. A new electronic mail creating screen with the electronic mail address for the transfer control server 2 is activated on the screen of the calling side terminal 6.

When an e-mail message is sent from the calling side terminal 6 to the electronic mail address [(4) in FIG. 11], the transfer control server 2 that received that e-mail message transfers the e-mail message to the family user terminal (A) 5A [(5) in FIG. 11].

FIG. 12 is a diagram showing a method for uploading a transfer approval list for calling subscriber authentication performed in the second exemplary embodiment of the present invention. In FIG. 12, the family user terminal 5 uploads a transfer approval list 9, which is a list of calls the family user approves to be transferred to the family user terminal 5, from the family user terminal 5 to the transfer control server 2 [(1) in FIG. 12], and registers the transfer approval list 9 to the authentication server 4 through the transfer control server 2 [(2) in FIG. 12].

The methods for uploading the transfer approval list 9 include a method for making a list from the address book in the portable telephone and uploading the list by using the portable telephone; and a method for uploading a file of the transfer approval list 9 that is made on the family user terminal 5 via the WEB access.

FIG. 13 is a diagram showing calling subscriber authentication according to the second exemplary embodiment of the present invention. In FIG. 13, when the transfer control server 2 receives a call from any of the calling side terminals 6A-6D, it tries authentication by comparing the call with the transfer approval list 9 at the authentication server 4.

As the call from the calling side terminal 6A cannot be authenticated against any of the family users, the FFN service is not activated and the call is connected to the fixed telephone terminal 5*a*. As the call from the calling side terminal 6B can only be authenticated against a "child" family user, the call is automatically transferred to a "child" terminal 5*d*.

As the call from the calling side terminal 6C can be authenticated against all the family users, a guidance asking which family user is the call to be transferred to ("1. Father, 2. Mother, 3. Child, 4. Grand Father") is announced. As the call from the calling side terminal 6D can be authenticated against the family users "Father" and "Child", a guidance asking which of them the call to be transferred to ("1. Father, 2. Child) is announced.

Figure 14:
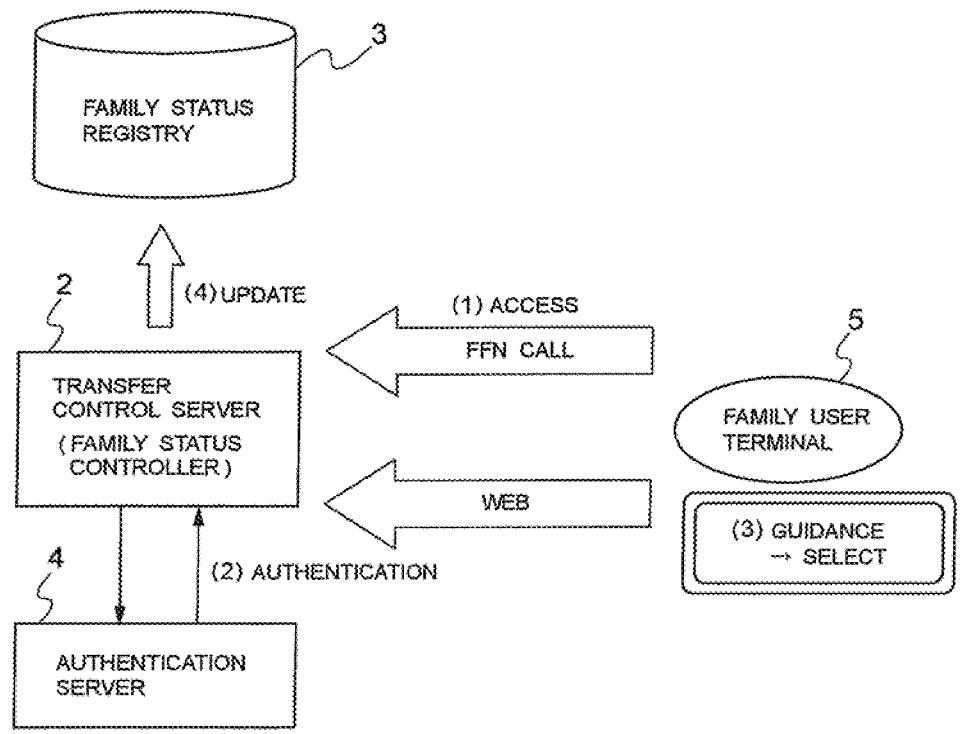
FIG. 14 is a diagram showing manual registration of family user status according to the second exemplary embodiment of the present invention.

FIG. 14 is a diagram showing manual registration of family user status according to the second exemplary embodiment of the present invention. In FIG. 14, the family user terminal 5 accesses the transfer control server 2 via the FFN call or the WEB access [(1) in FIG. 14] and authenticates as the family user at the authentication server 4 at first [(2) in FIG. 14].

After the authentication, the transfer control server 2 has a guidance announced to the family user terminal 5 [(3) in FIG. 14] so that the family user can change the status or the initial status registration. The family status registry 3 updates what changed at the family user terminal 5 by the transfer control server 2 [(4) in FIG. 14], and the status of the family users is to be managed in the family status registry 3.

Figure 15:
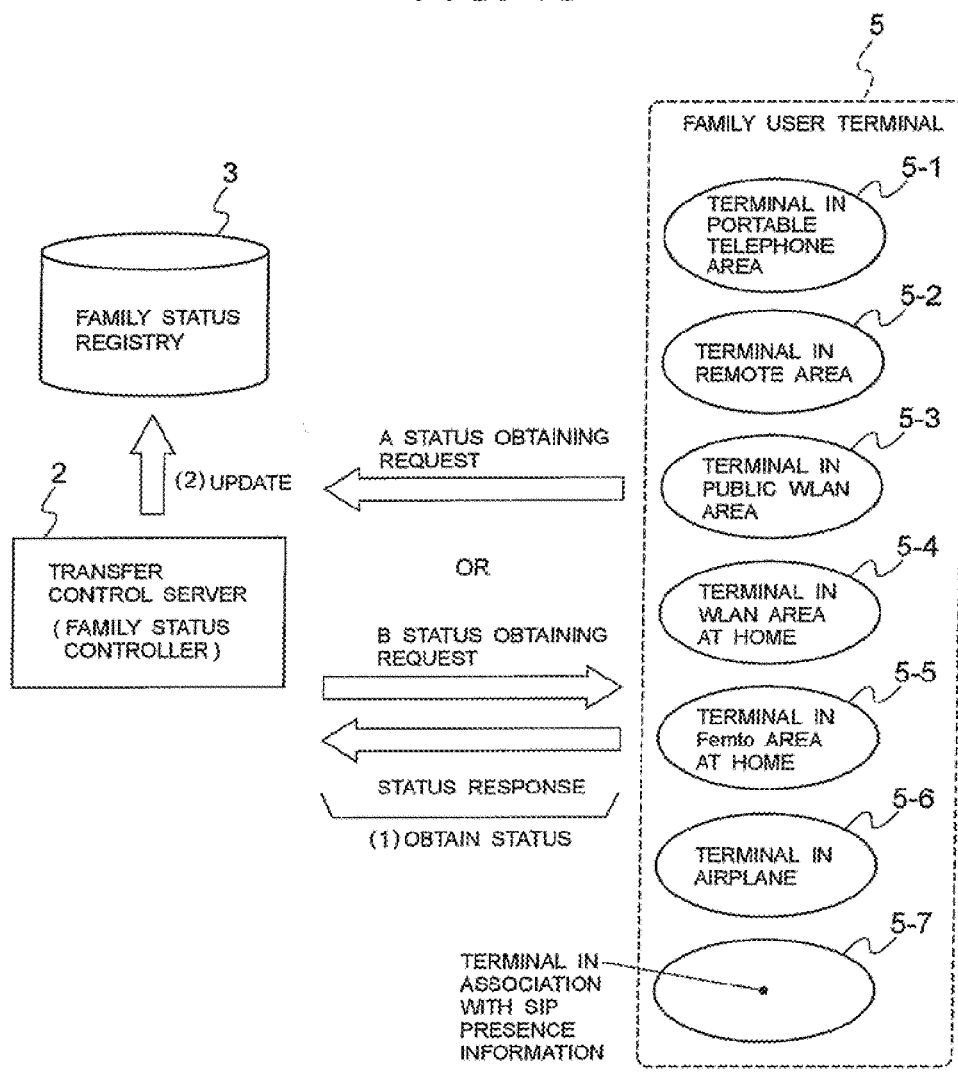
FIG. 15 is a diagram showing automatic registration of family user status according to the second exemplary embodiment of the present invention.

FIG. 15 is a diagram showing automatic registration of family user status according to the second exemplary embodiment of the present invention. In FIG. 15, timing of automatically obtaining the status of the family user terminal 5 is when the status is updated according to a change in the state of the family user terminal 5 side [(2) in FIG. 15]. A method of issuing a status obtaining request from the transfer control server 2 side to the family user terminals 5 by certain interval and obtaining responses is also available [(1) in FIG. 15].

The status of the family user terminal 5 includes: present in a portable telephone area (terminal in a portable telephone area 5-1), roaming in a remote area (remote area terminal 5-2), present in a public WLAN area (terminal in a public WLAN area 5-3), present in a WLAN area at home (terminal in a WLAN area at home 5-4), present in a Femto area at home (terminal in a Femto area at home 5-5), present in a airplane or a vehicle (terminal in an airplane 5-6) or association with SIP Presence information (SIP Presence associated terminal 5-7), and the like.

Those kinds of information on the family user terminal 5 are obtained from present cell information, GPS (Global Positioning System), Power ON/OFF or presence information and the like. The family status registry 3 is updated with those kinds of information, and the status of the family users is to be managed in the family status registry 3.

An exemplary advantage according to the second exemplary embodiment of the present invention is that the fixed telephone number of the family can be used as the key number of the family; that a plurality of numbers and addresses given to each member such as the fixed telephone number, the portable telephone number, the electronic mail address and the like can be unified; that a contact unit can be provided for a member who cannot be reached; and that a secret unit can be provided for a member who wants to keep personal information secret.

Therefore, the second exemplary embodiment of the present invention is quite advantageous in everyday life. In addition, the second exemplary embodiment of the present invention is quite pragmatic as it bases on practical uses of: timing of starting the service; authentication performed based on the calling terminal number; a method of limiting number opened and the like.

As mentioned above, the present invention uses the fixed telephone number of the family as the key number of the family so that it can transfer the call made to the fixed telephone to a family user. In addition, the present invention has status of each of the family users, to whom a call is to be transferred, manually or automatically registered so that a call can be flexibly received.

Therefore, according to the present invention, the calling subscriber can directly reach a specific family user by calling the telephone number of the fixed telephone, which is the key number of the family. That means the calling subscriber can reach the specific family user without knowing the portable telephone number, the electronic mail address and the like of that family user. Further, according to the present invention, as the user only needs to open the key number of the family, the user can intentionally keep the number that identifies the user secret from the calling subscriber.

The current status of the family user is manually or automatically registered in the family status registry 3, which is a status registering database, at the receiving side. Thus, the present invention can almost completely ensure the calling subscriber to reach a family user by making the receiving side receive the call in receiving means suitable for the registered status (fixed telephone, portable telephone, electronic mail or VoIP).

As mentioned above, the present invention can unify personal telephone numbers and electronic mail addresses so that the user only needs to open the telephone number of the fixed telephone in exchanging telephone numbers and electronic mail addresses with other persons without bothered to open those numbers and addresses in everyday life. Further, according to the present invention, even if the personal telephone numbers and electronic mail addresses of the specific family user are changed, the calling subscriber can contact with the family user if only the fixed telephone number of the family is left unchanged. In addition, the present invention is advantageous in terms of personal information protection, as it does not require a user to open numbers and addresses that identify the user and also authenticates the calling subscriber.

Any type of terminal devices may be used for the calling side device, such as a fixed telephone terminal, a portable telephone terminal, an IP telephone terminal, a PC (Personal Computer) type terminal and the like. An ordinary portable telephone terminal that is not available for the IP phone, however, cannot receive the IP phone. In such a case, the terminal receives the call in such a manner as using a 3G ($3^{rd}$ Generation) service. While the exemplary embodiments of the present invention have been described by taking an example of family users, the scope of the present invention is not limited to them. The present invention may be applied to the case where a plurality of members share a fixed telephone terminal or the like, and the case where a plurality of members in a small-scale office or the like share a fixed telephone terminal or the like, for example.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A telephone communication control apparatus comprising:
    a registry in which status information that indicates status of each of a plurality of members and communication method information corresponding to said status are registered, wherein said plurality of members share a fixed telephone terminal and respectively have communication terminals;
    an authentication unit that authenticates a number of a calling side terminal of a call by comparing the number of the calling side terminal and numbers in a transfer approval list in which numbers of calling side terminals approved to have a session with said members are indicated when said call is made to a number of said fixed telephone terminal; and
    a transfer control unit that transfers said call that is authenticated at said authentication unit to one of said communication terminals based on the communication method information corresponding to said status in said registry, wherein
    when the called communication terminal that the transfer control unit transfered said call to is unavailable for an incoming call and available for receiving an electronic mail, the transfer control unit issues a new electronic mail creating screen activation request to the calling side terminal to activate a new electronic mail creating screen with an electronic mail address for the transfer control unit on a screen of the calling side terminal, and
    the transfer control unit transfers an electronic mail sent from the calling side terminal to the called communication terminal.

2. A telephone communication control method comprising:
    registering of status information that indicates status of each of a plurality of members and communication method information corresponding to said status into a registry, wherein said plurality of members share a fixed telephone terminal and respectively have communication terminals;
    authenticating of a number of a calling side terminal of a call by comparing the number of the calling side terminal and numbers in a transfer approval list in which numbers of calling side terminals approved to have a session with said members are indicated when said call is made to a number of said fixed telephone terminal; and
    transfer controlling to transfer said call that is authenticated at said authenticating to one of said communication terminals based on the communication method information corresponding to said status in said registry, wherein
    when the called communication terminal that the transfer controlling transfered said call to is unavailable for an incoming call and available for receiving an electronic mail, the transfer controlling issues a new electronic mail creating screen activation request to the calling side terminal to activate a new electronic mail creating screen with an electronic mail address for the transfer controlling on a screen of the calling side terminal, and
    the transfer controlling transfers an electronic mail sent from the calling side terminal to the called communication terminal.

* * * * *